(12) United States Patent
Hundscheidt et al.

(10) Patent No.: US 8,510,365 B2
(45) Date of Patent: Aug. 13, 2013

(54) METHOD FOR OPTIMISING THE DISTRIBUTION OF A SERVICE FROM A SOURCE TO A PLURALITY OF CLIENTS IN A NETWORK

(75) Inventors: Frank Hundscheidt, GC Kerkrade (NL); Alexandru Hlibiciuc, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2410 days.

(21) Appl. No.: 10/725,714

(22) Filed: Dec. 2, 2003

(65) Prior Publication Data
US 2004/0199613 A1    Oct. 7, 2004

(30) Foreign Application Priority Data
Dec. 9, 2002  (EP) .................................... 02293038

(51) Int. Cl.
*G06F 15/16*  (2006.01)
*G06F 15/177*  (2006.01)

(52) U.S. Cl.
USPC .......................................... 709/201; 709/220

(58) Field of Classification Search
USPC .................................. 709/220, 201
See application file for complete search history.

(56) References Cited

U.S. PATENT DOCUMENTS

| | | | |
|---|---|---|---|
| 5,539,883 A * | 7/1996 | Allon et al. | 718/105 |
| 6,167,438 A | 12/2000 | Sulaiman et al. | |
| 2002/0169858 A1 * | 11/2002 | Bellinger et al. | 709/220 |
| 2003/0055811 A1 * | 3/2003 | Stork et al. | 707/1 |
| 2003/0185397 A1 * | 10/2003 | Ishiguro | 380/277 |
| 2003/0194093 A1 * | 10/2003 | Evans et al. | 380/282 |
| 2004/0032950 A1 * | 2/2004 | Graunke | 380/42 |
| 2004/0230980 A1 * | 11/2004 | Koyama et al. | 718/103 |
| 2005/0005272 A1 * | 1/2005 | Moody et al. | 718/104 |

FOREIGN PATENT DOCUMENTS

| | | |
|---|---|---|
| EP | 0 540 151 A2 | 5/1993 |
| EP | 1231753 A1 * | 8/2002 |

OTHER PUBLICATIONS

Bucci, et al., Supporting Process Migration Through Communicating Petri Nets. 1994.
Wagner, et al., ANTS: Agents on Networks, Trees and Subgraphs, Future Generations Computer Systems; Elsevier, Chance Publishers; vol. 16, No. 8, Jun. 25, 2000.

* cited by examiner

*Primary Examiner* — Lynn Feild
*Assistant Examiner* — Lin Liu (57) ABSTRACT

This method for determining locations of service instances for optimising distribution of a service in a network, from a source to a plurality of clients each having predetermined requirements, wherein the network can be modelled by means of a graph, comprises steps of: placing a service instance in each leaf in the graph; and, starting from the leaves, for each service instance: checking whether the service instance when placed in a vertex on the next higher level can fulfill the requirements of all clients to be served by said service instance; and moving or not the service instance one level higher, depending on the result of the checking step.

9 Claims, 9 Drawing Sheets

| | C1 | C2 | C3 | C4 | C5 | C6 | C7 | Clients | Tree Level |
|---|---|---|---|---|---|---|---|---|---|
| S1 | | | | | | | | | 1 |
| S2 | X | X | | | | | | C1, C2 | 2 |
| S3 | X | X | | | | | | C1, C2 | 3 |
| S4 | X | | | | | | | | 4 |
| S5 | X | | | | | | | | 5 |
| S6 | X | | | | | | | | 6 |
| S7 | | X | | | | | | | 4 |
| S8 | | | | | | | | | 6 |
| S9 | | | | | | | | | 5 |
| S10 | | X | | | | | | | 5 |
| S11 | | | | | | | | | 2 |
| S12 | | | | X | | | | | 3 |
| S13 | | | | X | | | | | 4 |
| S14 | | | | X | | | | | 5 |
| S15 | | | | | | X | | | 2 |
| S16 | | | | X | | | X | C4, C7 | 3 |
| S17 | | | | | | | X | | 4 |
| S18 | | | | | | | X | | 5 |
| S19 | | | | | | | X | | 6 |
| S20 | | | | X | X | X | | C4, C5, C6 | 4 |
| S21 | | | | X | | | | | 5 |
| S22 | | | | | X | | | | 5 |
| S23 | | | | | | X | | | 5 |
| | C1 | C2 | C3 | C4 | C5 | C6 | C7 | Clients | Tree Level |
| | 2 | 2 | 0 | 2 | 1 | 1 | 1 | Intersections | |

METHOD FOR OPTIMISING THE DISTRIBUTION OF A SERVICE FROM A SOURCE TO A PLURALITY OF CLIENTS IN A NETWORK

This application claims the benefit of the filing date as provided in 35 U.S.C. 119 of European patent application number 02293038.2 filed on Dec. 9, 2002, the disclosures of which are incorporated herein by reference.

FIELD OF THE INVENTION

The present invention relates to a method for optimising the distribution of service instances for providing a service from a source to a plurality of clients in a network.

BACKGROUND OF THE INVENTION

A service instance is an entity that can provide a service to a client. In the case of Internet services, the service instance is for example a proxy server; in the case of information services, the service instance is for example a database; in the case of logistics, the service instance can be a transfer station. In a telecommunications network, the "clients" may be for example access networks or access nodes or user terminals.

The invention is described here, by way of non-limiting example, in its application to a telecommunications network of the WAN (Wide Area Network) type, for Point-To-Multipoint (PTM) service distribution. However, it can be applied in a number of other domains, such as logistics, traffic management, etc.

Depending on the topology of the network, the placing of service instances may be rather complex.

In a distributed system wherein services are accessed simultaneously by multiple, geographically distributed clients, an optimal service distribution strategy should consider many factors, depending on the requirements of a variety of terminals and sub-networks. It should also consider the service requirements. In addition, an optimal strategy should limit the number of service instances (i.e. equipment or service items providing the service to the clients), while providing adequate service quality to all clients. However, there is currently no well-defined solution for such PTM scenarios.

The present invention aims at overcoming this drawback.

SUMMARY OF THE INVENTION

To this end, the present invention provides a method for determining locations of service instances for optimising distribution of a service in a network, from a source to a plurality of clients each having predetermined requirements, wherein the network can be modelled by means of a graph, the method being remarkable in that it comprises steps of:
  placing a service instance in each leaf in the graph; and starting from the leaves, for each service instance:
  checking whether the service instance when placed in a vertex on the next higher level can fulfil the requirements of all clients to be served by this service instance; and
  moving or not this service instance one level higher, depending on the result of the checking step.

According to a particular feature, the method further comprises the steps of determining that at least two service instances meet in the above-mentioned vertex and combining these service instances.

Thus, the minimum number of service instances necessary to provide the service to the clients in a network as well as the corresponding locations of these service instances can be determined.

According to a particular feature, the method further comprises a step, prior to the placing step, of determining levels in the graph.

Thus, if the graph modelling the network does not comprise levels per se, this step makes it possible to build a levelled structure of the graph.

The checking step may comprise a table-based analysis step, or a Petri net analysis step.

With the same object as that mentioned above, the present invention also provides a vertex in a graph modelling a network, remarkable in that it implements a method as succinctly described above.

With the same object as that mentioned above, the present invention also provides a server in a telecommunications network, remarkable in that it is a source implementing a method as succinctly described above.

With the same object as that mentioned above, the present invention also provides a device for determining locations of service instances for optimising distribution of a service in a network, from a source to a plurality of clients each having predetermined requirements, wherein the network can be modelled by means of a graph, this device being remarkable in that it comprises:
  a lodging unit, for hosting a service instance;
  a checking unit, for checking whether the service instance when placed in a vertex on the next higher level can fulfil the requirements of all clients to be served by this service instance;
  a processing unit, for coordinating the lodging unit and the checking unit and for controlling the vertex; and
  an input/output unit, for sending and receiving messages and service instances.

According to a particular feature, the device further comprises a combining unit, for determining that at least two service instances meet in the vertex and for combining these service instances.

With the same object as that mentioned above, the present invention also provides a vertex in a graph modelling a network, remarkable in that it comprises a device as succinctly described above.

The advantages of the vertices, of the server and of the device are similar to those of the method according to the present invention and are therefore not repeated here.

Other features and advantages of the present invention will appear upon reading the following detailed description of preferred embodiments, given by way of non-limiting examples.

DETAILED DESCRIPTION OF THE DRAWINGS

In the following, there is considered a telecommunications network of the WAN type.

A service is to be distributed from a source, such as a server, to a plurality of clients in the network.

Before applying the optimisation method according to the invention, a number of preconditions to be fulfilled may optionally be defined. By way of non-limiting example, it may be required that the maximum number of service instances does not exceed a predetermined percentage (e.g. 25%) of the actual number of clients that are being served. Moreover, it may be required that the delay associated with the distribution of the service to each client does not exceed a predetermined value (e.g. 500 ns, or any other value specified by the service).

It is assumed that the network can be modelled by means of a graph, for example by using a tree-based topology (in which case the graph is a tree) or a partially or fully meshed topology, both well known from a person skilled in the art.

The "destination points" in the graph are the sub-networks that are connected to the clients (i.e. the leaves in the tree). The destination points know, for example from conventional routing protocols, such as BGP (Border Gateway Protocol), the distance to the server that initially provides the service.

According to the present invention, the maximum distance allowed between the service instances and the destination points is determined on the basis of predefined metrics.

"Network metric" has the meaning of a function $d(X,Y)$ defined on the Cartesian square of a given set, e.g. a set of network nodes, satisfying a number of standard properties: d is non-negative, it satisfies a triangle property, $d(X,Z) \leq d(X,Y)+d(X,Z)$, and $d(X,X)=0$ for any nodes X, Y, Z. To define a metric in a network, it is sufficient to define the length of each connection between two nodes in the network. Given a number of metrics $d_1, d_2, \ldots, d_k$ defining the distances between arbitrary nodes X, Y in the network, it is possible to reduce these metrics into a single, combined metric $d(X,Y)$ by using existing procedures well known from a person skilled in the art, for example by taking the maximum of $d_1, d_2, \ldots, d_k$ or their sum or even their convolution with a given weight, depending on the subscriber or customer requirements, the costs, etc.

A typical example of metrics is related to the quality of service, such as bandwidth, delay, jitter, reliability, security, response time RTT (Round Trip Time) or a combination of these factors. The required metric or a corresponding required minimum and/or maximum value is determined by the destination points (e.g. the clients in case of service provisioning), the source (e.g. a service), the network provider, the service provider or any combination of these entities.

Therefore, depending on the context, the term "metric" may have either the meaning of a representation of a certain network, of a connection or a link, or the meaning of a representation of distance in graph theory, or more generally in metric spaces theory.

A destination point in the graph may represent either a single entity, such as a client terminal or an access network, or a collection of entities, such as all clients in an access network, all clients in a specific area, all clients with the same characteristics, all customers of a specific logistics service, etc. It is to be noted that the clients may be connected to the destination points in an indirect manner, e.g. via a sub-network that is not modelled in the graph.

Figure 1:
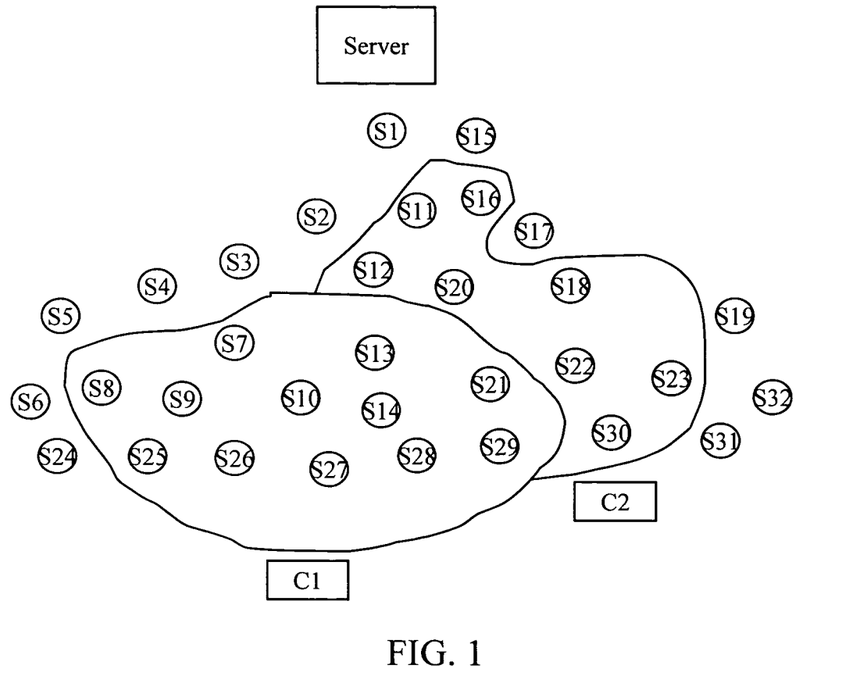
FIG. 1 illustrates schematically a network wherein two intersecting sets of sub-networks for providing a service respectively from a server to two clients are identified, wherein the sets of sub-networks contain those sub-networks that can provide the service with adequate service quality.

As shown in FIG. 1, several networks or sub-networks (seven intersecting networks in FIG. 1) between the server and client(s) may be used to host service instances. The (sub-)networks, depicted by labels Si, $i=1, \ldots, 32$ on the drawing, are not necessarily on a single path between the server and the client(s).

In the case of a single client, it is possible to determine all surrounding (sub-)networks where a service instance would enable adequate service quality provisioning, i.e. would fulfil the client's requirements. Such an analysis can be based on distance vector routing protocols that use a table with the shortest paths to all destinations, i.e. (sub-)networks. The result of such an analysis step would be a table per client (or per access network) indicating all the (sub-)networks that can host service instances and provide adequate service quality. This table can then be sorted on path distance from the client(s) to the corresponding (sub-)networks, where each (sub-)network is represented only once in the table (per client). The path distance is determined by any of the metrics or metrics combinations mentioned above.

Figure 2:
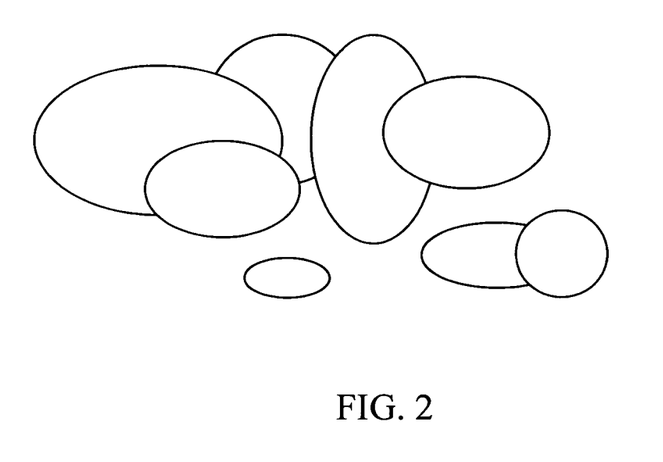
FIG. 2 illustrates schematically the complexity of the service distribution topology in the case of a higher number of clients.

However, in a partially or fully meshed topology, many paths generally exist between the client(s) and server and hence, the above-mentioned tables will contain many (sub-)networks. Therefore, in the case of a multiclient service distribution situation, an optimisation step is required in order to determine, out of the possible (sub-)networks per client, the (sub-)networks for service distribution with the minimum number of service instances. FIG. 1 shows that for both clients C1 and C2, the sets of (sub-)networks that provide adequate service quality have been identified. The (sub-)networks S10, S13, S14, S21, S28 and S29 are part of the intersection between the two networks and can carry out service provisioning for both clients. Although it is possible in this scenario to identify an optimal (sub-)network from the intersection, the problem becomes complex when several thousands of clients are involved and that an optimal service distribution must be determined for many intersections of many clients, such as in the case of a plurality of intersecting sets of (sub-)networks, as illustrated in FIG. 2. Furthermore, adding or removing clients may affect a significant part of the service distribution topology.

Therefore, a simplified topology representation is needed. A delivery tree structure can be used in order to optimise the topology and minimise the number of required service instances. Since the service distribution has a single source and multiple clients, the delivery tree can be created, by way of non-limiting example, by the Reverse Path Multicast (RPM) algorithm described by Hersent et al. in "IP Telephony: Packet-based multimedia communications systems", Addison-Wesley, Harlow, 2000.

As known from a person skilled in the art, the RPM algorithm builds source-based trees that span (sub-)networks with clients. Other delivery trees, such as minimum cost spanning trees or Steiner trees, can also be applied.

The RPM distribution tree algorithm creates a tree of (sub-)networks with exactly one shortest path from the server to all clients/access networks. Since there is a unique path from the server to each access network, loops are impossible.

Each path from the server will end in one access network.

Thus, the access networks are leaves in the service distribution tree.

Figure 3:
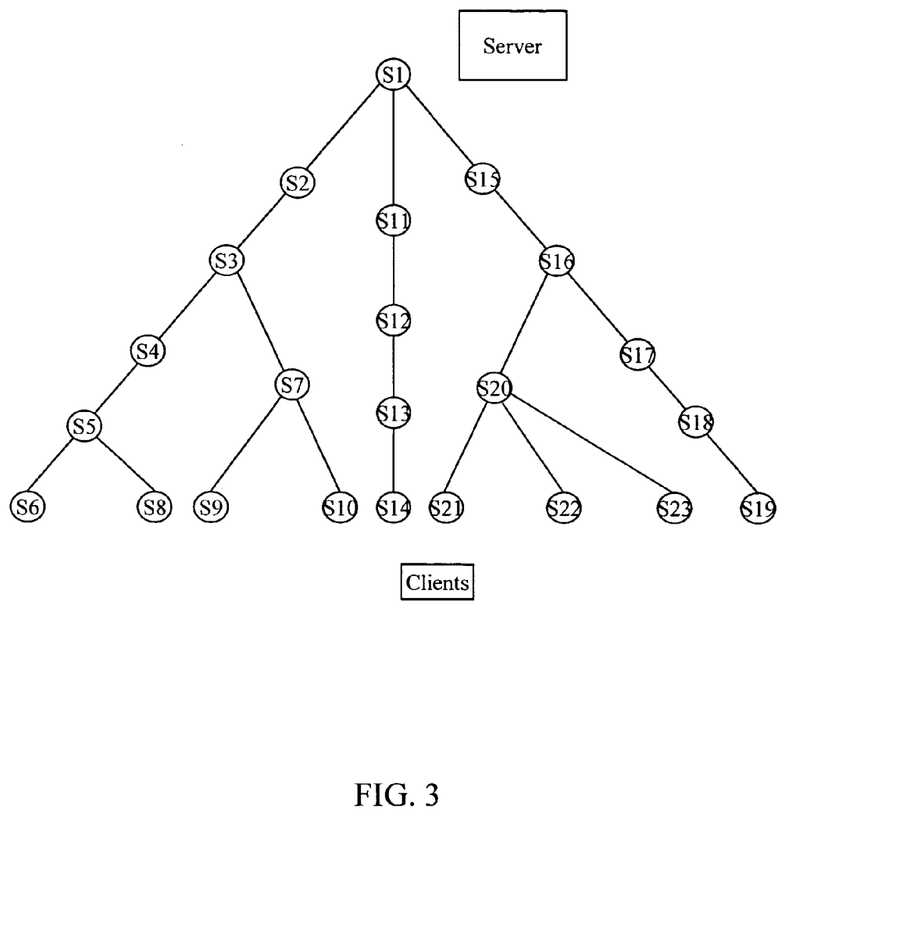
FIG. 3 shows an example of a service distribution tree.

FIG. 3 shows an example of a service distribution tree. Such a tree can be based e.g. on the RPM algorithm. The service network/the server is the root of the tree and the access networks are its leaves.

Distributing a service from the service network to S6 restricts the service instances to be placed in one of the (sub-)networks on the path S1, S2, S3, S4, S5, S6. Distributing a service from the service network to S21 implies that the service instances be placed in a (sub-)network on the path S1, S15, S16, S20, S21.

Different service requirements can be handled via a single tree built on the basis of a combination of metrics for these given requirements.

Different service distribution algorithms according to the invention exist, depending on the topology of the network (tree-based or meshed), the type of processing (central or distributed) and the triggering mode, i.e. the mode of starting the analysis leading to the optimisation.

The processing is either done in a central unit (e.g. the source, which is for example the location of the server), or distributed in the different nodes (e.g. where the sub-networks are located).

The triggering, i.e. the start of the analyses in the central unit or in the different nodes is either done by a central unit, level by level, or is node-implicit, i.e. the different nodes perform an independent processing and merely trigger the next node (which, as will be seen later, is a higher level node) by sending a service instance there.

Thus, there are at least four possible embodiments of the optimisation method according to the invention:
- a service distribution optimisation procedure with a tree-based topology, a distributed processing and a central triggering;
- a service distribution optimisation procedure with a tree-based topology, a distributed processing and a node-implicit triggering;
- a service distribution optimisation procedure with a tree-based topology, a central processing and a central triggering; and
- a service distribution optimisation procedure with a meshed topology, a central processing and a central triggering.

According to the invention, it is wished to minimise the number of service instances. During the steps described below, the placement of service instances is semi-permanent, since, optionally, an additional procedure can be applied in order to try to move the service instances closer to the clients without the need to replicating the service instances. During this optional procedure, the service instances can be placed in other nodes. Of course, this can only be done when the service instance is moved towards the clients on a non-diverging path.

Depending on the chosen strategy, it may be decided to place service instances, not closer to the clients, but closer to the source. The invention applies of course to both cases.

For carrying out the procedure of moving the service instances closer to the clients, there are two options:
- either the last level at which two service instances have been merged is remembered for each service instance, and the service instance is moved down, i.e. closer to the clients, until that level is reached;
- or a node knows how many branches it has, and the service instance is moved down as long as a node has only one branch leading to the clients (i.e. until the service instance would have to be replicated when moving down any further).

Figure 4A:
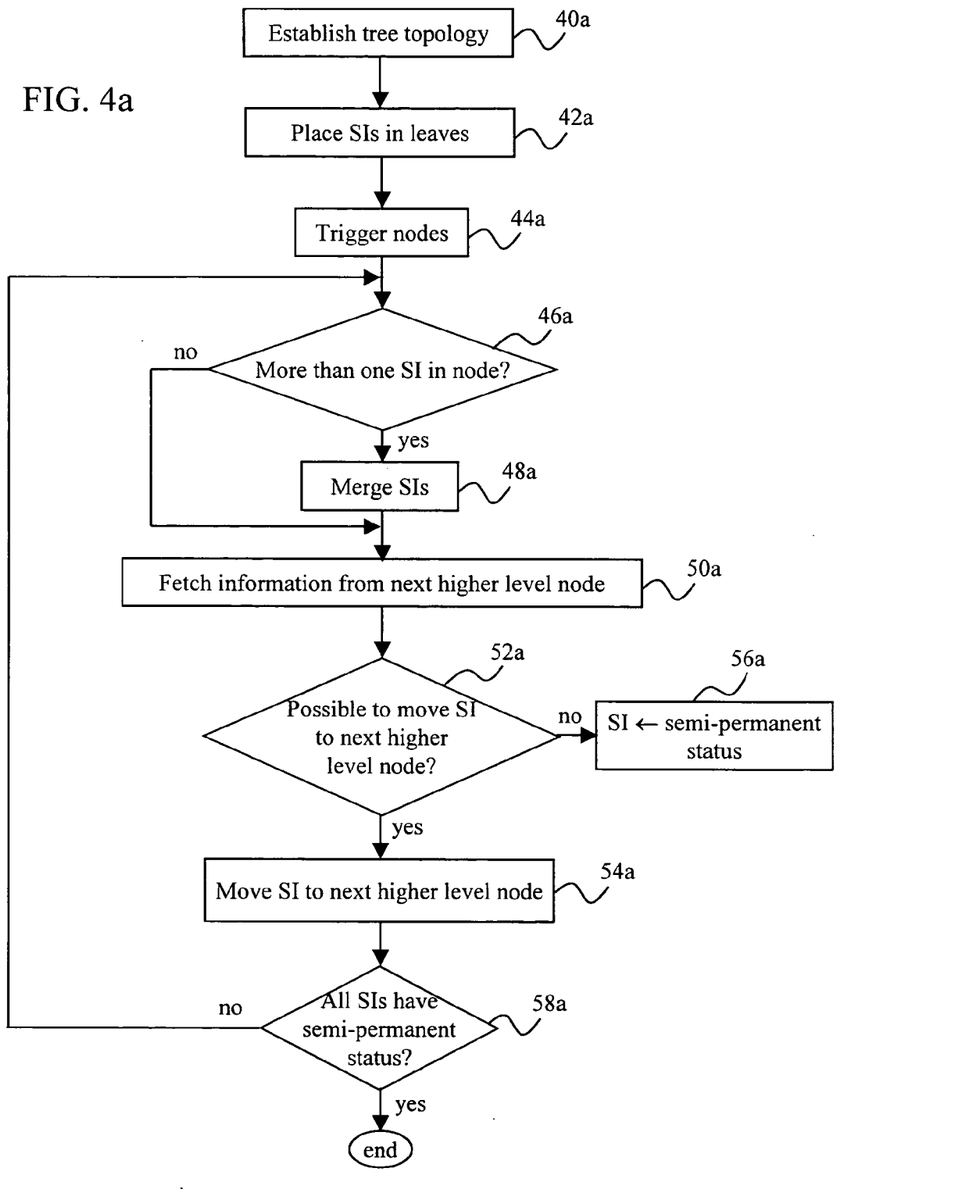
FIGS. 4a, 4b, 4c, 4d are flow diagrams showing successive steps of an optimisation method in accordance with the present invention, in various embodiments wherein the network is modelled by means of a tree-based topology.

Let us first consider the case of a service distribution optimisation procedure with a tree-based topology, a distributed processing and a central triggering. This embodiment is shown in FIG. 4a.

First, a tree topology of the network is established, for example by using a conventional routing protocol (step 40a). Either a single metric or metric combinations are used. In case of a metric combination, it can be advantageous to combine different metrics into a single overall metric, e.g. by means of weighing.

Next, service instances are placed in all leaves of the tree (step 42a). For determining the leaves, either the source (or root) of the tree knows the leaves from the routing protocol information, or a service instance is broadcast through the tree and the leaves are those points that keep the service instance (instead of transmitting it). Service instances may be representatives of a real service instance (e.g. via a mobile agent, which is a software module), or the service instance itself may be used. Leaves may have different distances to the root, i.e. leaves may be located at different levels in the tree.

As an option (not shown), it is then checked whether there is a service instance in a node before applying the trigger to that node. Otherwise, the trigger is sent to all nodes on the corresponding level (step 44a), e.g. the trigger is broadcast and each node checks whether it is on the requested level in the tree (e.g. each node increments a level counter and broadcasts the message to all its child nodes). The root may also know the nodes for a given level from the routing protocol information.

If there is more than one service instance in the same node (test 46a), they are merged. This means that the service instances are treated as a single service instance.

Thus, the new single service instance has to take into account all requirements of all the clients that are now served by the new single service instance. This can be implemented for example by selecting the lowest or respectively highest value for each metric that is requested by any of the clients. This merging procedure may be carried out at the end of the global loop, which is performed upon triggering of a given level. As a simpler variant, all requirements from all clients are combined but not merged.

Next, the necessary information is fetched from the next higher level node, if any (step 50a).

If, on the basis of this fetched information, i.e. considering simultaneously the characteristics of the next higher level node and the client, service, etc., requirements, it is possible to move the service instance to the next higher level node (test 52a), then the service instance is moved to the next higher level node (step 54a). Otherwise, this means that the service instance cannot be moved higher and the service instance is given a semi-permanent status (step 56a). This information is transmitted to the root.

The global loop ends when all service instances have received a semi-permanent status (test 58a).

Afterwards, optionally, as explained above, the procedure for moving the service instances closer to the clients (not shown) is carried out.

If clients are removed or new clients are added, the procedure is reiterated for all nodes, unless nodes remember for which branches they are responsible, which clients they serve and corresponding restrictions.

Figure 4B:
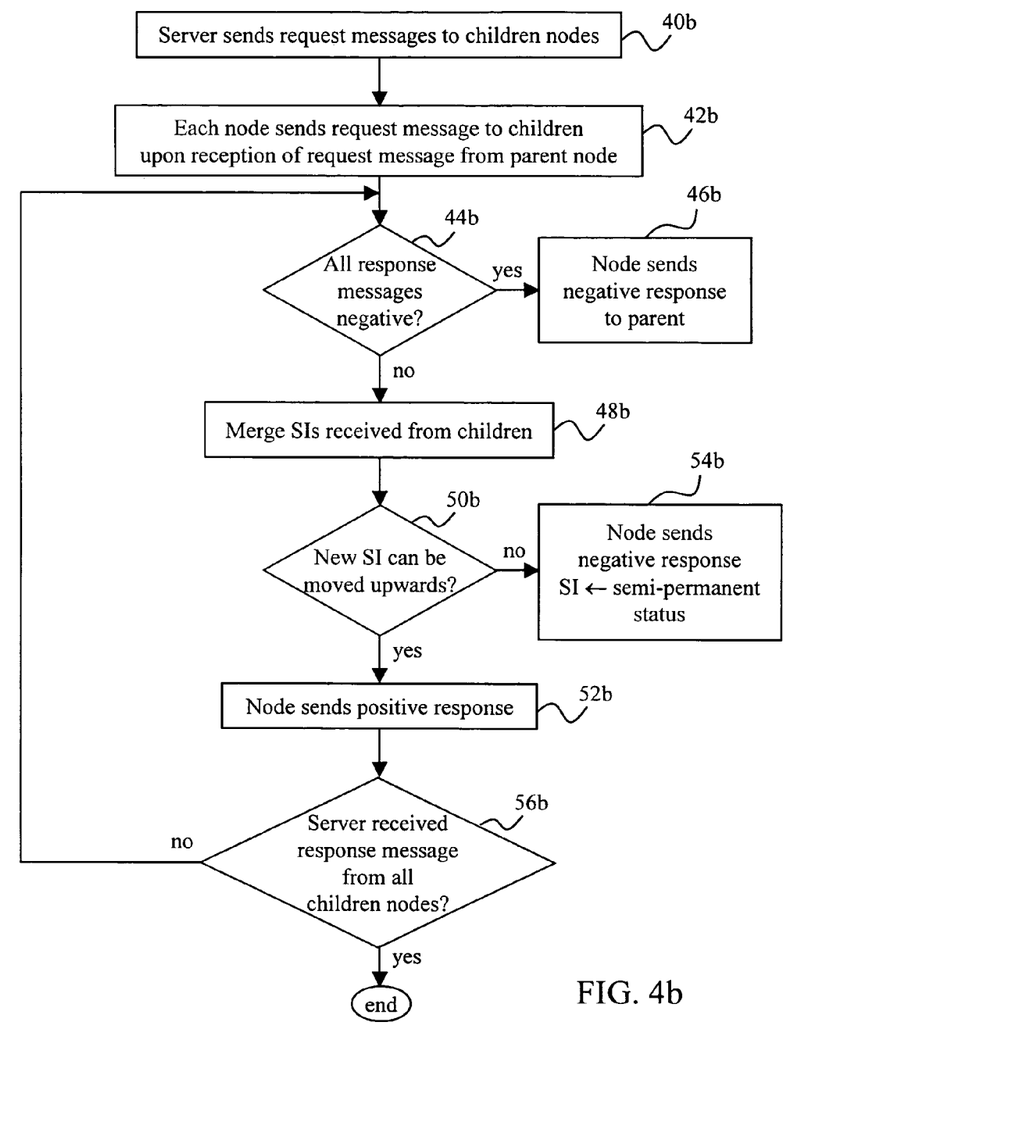

Let us now describe a recursive variant of this procedure. We assume that the leaves are aware of the requirements and restrictions put on the service instance by clients that should be provided with the service. This embodiment is illustrated by FIG. 4b.

The recursive procedure uses two messages, namely a request message and a response message.

A node sends a request message to the adjacent nodes within the next lower level in the tree (i.e. to its children nodes). If a leaf, that is a node directly connected to at least one client, is reached, a service instance is created.

In a further embodiment of the invention, service instances are placed at the leaves before the sending of a request message.

In both embodiments, a leaf performs the steps of:
1. receive a request message
2. check whether the service instance can be placed at the parent node;
   if so, a positive reply, comprising the requirements of the at least one client, is sent;
   if not, a negative reply is sent and the service instance is given a semi-permanent status.

It is to be noted that a request message can carry information about the characteristics of the parent node and the link needed for checking whether or not a service instance can be moved into the node from the level below.

The response message carries service instances and the related information, e.g. requirements on the service quality and other restrictions. A negative response may also be sent, meaning that no service instance will be moved up from the child node.

As mentioned above, the tree topology is established and assumed to be known. For instance, based on routing protocol information, when a given node receives a request message, it automatically deduces therefrom that the node that originated the request message is its parent, and that the receiving node is a parent node for remaining adjacent nodes which are then considered to be its children nodes.

According to the recursive procedure, the following steps are performed.

1. In order to start the execution of the procedure, the server sends request messages to its children nodes (step 40b).
2. Each node waits for a request message from its parent node.
3. When a request message is received from the parent node, the node sends a request message to all its children (step 42b).
4. After the request messages are sent, the node waits for response messages from all its children.
5. If all the response messages are negative (test 44b), the node sends a negative response to its parent upwards, and does not place any service instance in it (step 46b).
6. Otherwise, if at least one positive response is received, the node merges the service instances received from its children and builds the cumulative requirements and restrictions for the new service instance obtained by merging (step 48b). As a simpler variant, all requirements from all clients are combined but not merged.
7. Afterwards, the node checks whether the new service instance can be moved upwards (test 50b). If so, the node sends a positive response with the service instance characteristics (step 52b). Otherwise, a negative response is sent and a semi-permanent status is assigned to the service instance in the node (step 54b).
8. The execution of this procedure stops when the server receives response messages from all its children nodes (test 56b). In case of at least one positive response message, a service instance with a semi-permanent status is placed in the server.
9. Optionally, the service instances having a semi-permanent status can be moved closer to the clients, as mentioned above.

With slight modifications, this recursive procedure will work in a dynamic approach, when new clients are added or clients are deleted. For this purpose, each node shall keep its last response message and the last response messages it received from its children. Then, upon arrival of a response message, the node is able to re-evaluate the characteristics of the service instance and send a new response message to its parent node if needed. Therefore, in a dynamic framework, nodes should not wait until all the response messages are received from their children. Each node should answer the message received from its parent after a predetermined timer expires. The timer will have to be adjusted properly in order to avoid too frequent re-evaluation of the service instance in the node and too many new responses. It is to be noted that a timer may also be used in the procedure described above, carried out in a non-dynamic framework. The timer value can be determined from the path distances, which information is available for example from the routing protocols.

Figure 4C:
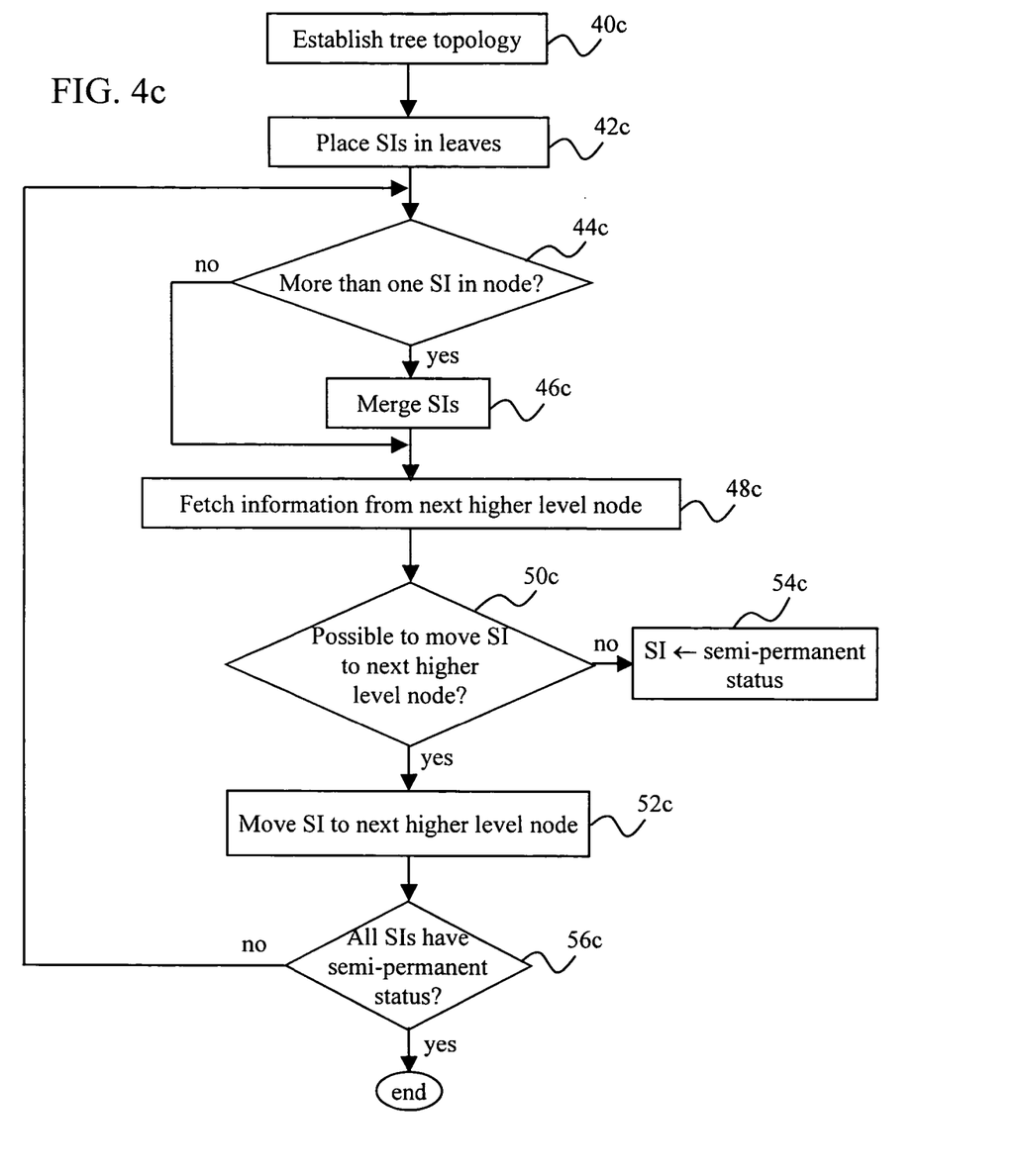

Let us now consider the case of a service distribution optimisation procedure with a tree-based topology, a distributed processing and a node-implicit triggering. This embodiment is illustrated by FIG. 4c.

Like in the previous cases, a tree topology of the network is first established and service instances are placed in all leaves of the tree (steps 40c, 42c).

A loop is then performed for each service instance. If there are other service instances in the node, they are merged (test 44c, step 46c). As well as in the previous embodiments, as a simpler variant, all requirements from all clients are combined but not merged. The necessary information is then fetched from the next higher level node, if any (step 48c). If it is possible to move the service instance to the next higher level node (test 50c), the service instance is moved to the next higher level node (step 52c) and optionally, a footprint, e.g. a pointer, is left in the lower level node, indicating that the service instance passed the corresponding node previously. If it is not possible to move the service instance to the next higher level node, the service instance is given a semi-permanent status (step 54c).

Optionally, if there is a footprint in the node, a corresponding message is sent towards the root. A higher level node that receives this message (on its way to the root) checks whether it meets the requirements of clients that can be served by the sender of the message. If yes, it removes said requirements and calculates new cumulative requirements for the remaining clients.

The loop stops when all service instances have been assigned a semi-permanent status (test 56c).

Afterwards, optionally, the service instances having a semi-permanent status can be moved closer to the clients, as mentioned above.

In this scenario, a node may know its level in the tree from the routing protocol information. This amounts to follow a level by level approach, as in the previous case (tree-based topology, distributed processing, central triggering) but without a central control and triggering unit.

As mentioned above, instead of the corresponding service instance requirements, each node can store a footprint corresponding to the service instance when that service instance has passed this node previously. When another service instance arrives in that node, it can retrieve all necessary information from the footprinted service instance. A footprint may also be used to optimise the procedure: a node only sends a message upwards (i.e. towards the root) when a new semi-permanent service instance is to be placed in the node and that node has a footprint. When a higher level node removes the service instance (because a lower level node has placed the service instance), all footprints between the higher level node and the node where the service instance is now placed have to be removed. Additionally, the higher level node informs the lower level node that hosts the service instance for the clients served previously by the node, about the clients served and their requirements. Thus, each service instance is aware of the clients and their requirements on service instance capabilities.

This procedure can also handle removals and additions of clients dynamically. For the new clients, a service instance is placed in the corresponding leaf node. The service instance is then moved towards the root according to the procedure described previously. For removed clients, a message is sent upwards, faking that a service instance for that client has been placed at a lower level. The higher level node with the service instance that was serving this client then removes the corresponding requirements for the removed client.

Let us now consider the case of a service distribution optimisation procedure with a tree-based topology, a central processing and a central triggering.

This procedure is not shown in the drawings since it is essentially the same as the procedure that is carried out in the case of a tree-based topology, a distributed processing and a central triggering (illustrated by FIG. 4a). The only difference is that no triggers are needed. Further optimisations are possible, due to the fact that all the required information is centrally available.

It is to be noted that a combination of central processing and distributed information retrieval (wherein the root or server retrieves information by means of queries from the different nodes) would be handled by the same procedure.

Figure 4D:
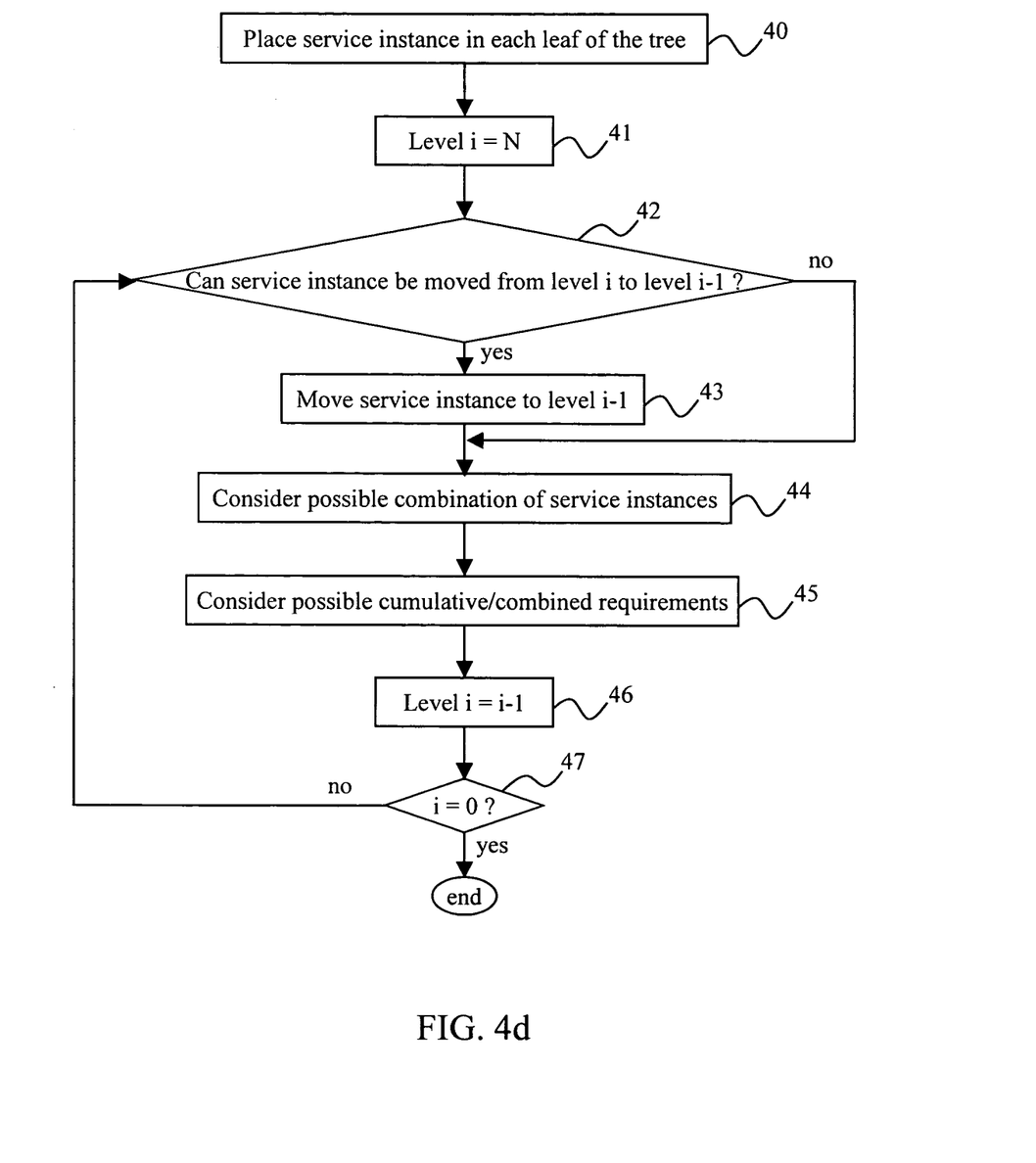

The flow diagram of FIG. 4d summarises the succession of steps carried out according to the optimisation method which is the subject-matter of the invention, in a first preferred embodiment where the network is modelled by means of a tree-based topology.

Before the optional procedure (not shown), consisting of trying to move the service instances closer to the clients, is carried out, the optimisation method according to the invention is performed as shown in FIG. 4d.

During a first step 40, a service instance is placed in each leaf of the tree.

Next, starting from the leaves in the tree (level N) and moving towards the root (level 0), as shown by the initialisation step 41 and the decrementation step 46, level by level in the tree, the following procedure is carried out:

For each vertex of the examined level where a service instance is placed, it is checked (test 42) whether the service instance can be moved further up towards the root of the tree, provided the root is not reached yet (a test 47 follows the decrementation step 46 and consists in checking whether the index representing the level is equal to 0).

In order to know whether the service instance is allowed to be moved higher up in the tree, the vertex can contact the next vertex higher up in the tree, e.g. the corresponding resource manager in case of a sub-network, in order to request the resource status. The request can be either a general request, or a dedicated request for the corresponding relevant metrics.

As a variant, the vertex may use resource information received from higher levels in the tree without sending any request.

Thus, it is checked whether the service instance placed in the vertex fulfils the requirements of all clients.

If the result of test 42 is positive, the service instance is moved to level i-1 (step 43). Otherwise, the location of the service instance is left unchanged.

The two following steps 44 and 45 consist in considering the possibility of combining several service instances with each other, and considering their possible cumulative or combined requirements, respectively. Step 45 is optional.

For example, during step 44, whenever two or more service instances meet in the same vertex, they are advantageously combined into one single service instance and the corresponding metric value describing a requirement is either the minimum or the maximum value of the metric of the cumulative requirement, depending on the type of metric. For example, if the metric represents a delay, the single metric associated with the cumulative requirement is the minimum of both former metrics, whereas if the metric represents the bandwidth, the metric value associated with the cumulative requirement is the maximum of both former metrics. As a result of the combination of service instances, a single combined service instance then provides the service to multiple clients simultaneously. As a simpler variant, all requirements from all clients are combined, but not merged.

During step 45, in case different metrics or combinations of metrics are used for the individual branches of the tree, they are advantageously combined into a bigger set of metrics. For example, in case one of the branches of the graph uses only a metric based on delay, whereas another branch uses only a metric based on the bandwidth, the combining vertex may use both the delay and the bandwidth for both branches or it may use each metric individually for each of the branches. For example, for a video streaming service, the combination of metrics may include a predetermined maximum delay, a predetermined minimum bandwidth and a predetermined minimum jitter (i.e. maximum delay variation) to ensure an acceptable quality of service.

In another preferred embodiment, the network may be modelled, not by a tree-based topology, but by a meshed topology.

Let us consider the case of a service distribution optimisation procedure with a meshed topology, a central processing and a central triggering. The procedure is as follows.

1. A network metric is built based on given requirements and constraints on delay, etc.

2. A levelled structure of the network is built, so that the first level consists of the server, whereas other levels consist of the nodes being at the same distance from the server. Clients can be in any level, except the first one. The levels are ordered according to their distance from the server (the larger the distance, the higher the level number).

3. A set C of all clients that need to be provided with the service is built.

4. Each network node is marked as being able to serve a client in case the existing constraints allow the client to be served by a service instance placed within that node of the network. Thus, one and the same node can be marked with several potential clients.

5. The level with the highest number, that is to say the level most distant from the server, is selected.

6. A set S of so-called "forbidden" clients is built, which are clients that may be served by the given level but which cannot be served by any service instances if placed closer to the server.

7. If the set S is empty, the following step is step 11 below.

8. The node N of the given level which may serve at least one forbidden client and at the same time serve the maximal number of clients is searched and a service instance with a semi-permanent status is placed in that node.

9. All clients that may be served by the node N are removed from the sets S and C (the removed clients are disregarded at further steps).

10. If the set S is not empty, the following step is step 8.

11. The procedure stops when the set C of clients is empty or all levels have been considered.

12. The level which is next to the level that has just been considered and closer to the server node is selected, and the following step is step 6.

Step 8, which is a so-called "greedy" step, since it does not necessarily deliver an optimal result, can be modified as appropriate, depending on the network and existing requirements. For example, it may consist in searching the node N of the given level which may serve the maximal number of forbidden clients and in placing a service instance there.

The complexity of the proposed procedure may vary, depending on effectiveness of implementation, and especially on data structures used for network representation. In order to increase efficiency, modifications of the procedure can be considered; for example, steps 2, 3, 4 can be performed dynamically to the required extent at step 6.

Afterwards, optionally, the service instances having a semi-permanent status can be moved closer to the clients, as mentioned above.

Figure 5:
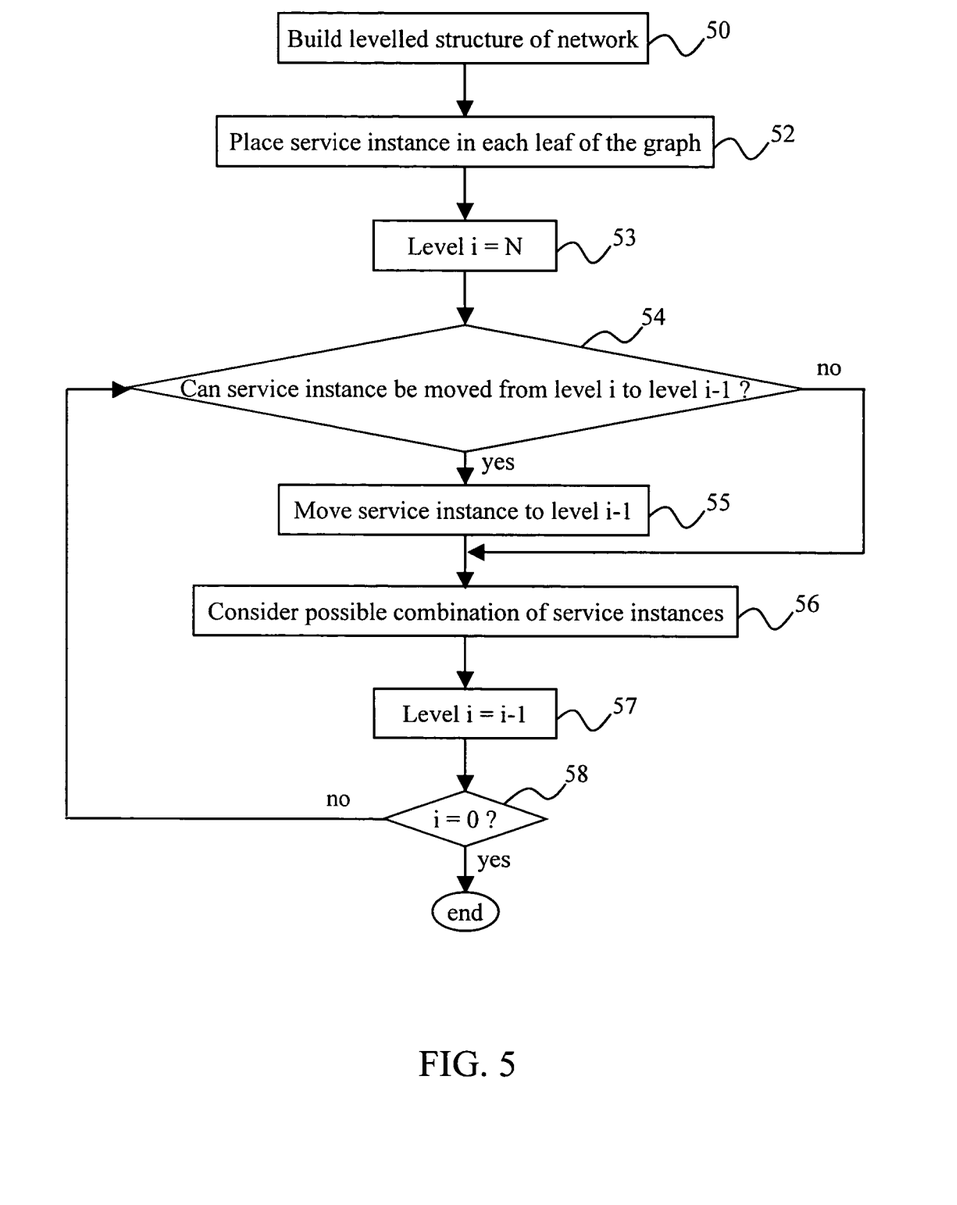
FIG. 5 is a flow diagram showing successive steps of an optimisation method in accordance with the present invention, in another embodiment wherein the network is modelled by means of a meshed topology.

The flow diagram of FIG. 5 summarises the succession of steps carried out according to the optimisation method which is the subject-matter of the invention, in such a preferred embodiment.

As shown in FIG. 5, a preliminary step 50 consists of building a combined network metric based on given requirements and constraints on quality of service and other characteristics, that a service instance shall fulfil.

A levelled structure of the network is built using the combined metric, pursuant to step 2 described previously. This may be done by using a conventional routing protocol, which is aware of shortest paths towards network nodes and their length.

The next steps 52, 53, 54, 55, 56, 57, 58 are similar to steps 40, 41, 42, 43, 44, 46, 47, respectively, of the embodiment of FIG. 4d and their description is not repeated here.

In such a meshed topology, as well as in the case of a tree-based topology, the destination points in the graph are the sources where the service instances start their way towards the service provider. The different destination points in the graph may be at different distances from the service provider, i.e. the numbers of sub-networks between each of the destination points and the service provider may be different.

Since the address of the service provider is known, the standard routing tables of the routing protocol implemented in the network can be used to determine the next hop to reach the service provider.

Either the characteristics of all networks are available, e.g. in a table, or the characteristics of the next sub-network must be fetched when it is known which sub-network is the next one on the way towards the service provider. The selection of the next sub-network is based on the routing metric, which uses for instance delay as the routing criterion. Since multiple metrics may have to be considered simultaneously, either for one client, or in the case of a cumulative metric for multiple clients, the routing protocols have to be extended to route data on the basis of multiple metrics simultaneously, unless the multiple metrics are combined into a single metric, as previously described.

For ensuring that different service instances be combined, service instances can leave an indication, which is called a "footprint", in each of the sub-networks that they passed on their way towards the service provider, so that these indications can be used by service instances that arrive in the same sub-network during a later analysis step. It makes it possible to trace the corresponding service instance and to combine several service instances.

The indication left in each sub-network in which the service instance moved may be a pointer to that sub-network. In this case, when moving to a new sub-network, the service instance may possibly update all pointers. However, pointers are either direct (i.e. they point to the sub-network with the service instance) or indirect (i.e. they point to a sub-network which is the next one on the way to the sub-network with the service instance). Only in the first case, all pointers have to be updated. Therefore, no path traversal and checking is required in each node, since the final address is known.

As a variant, in a sub-network in which the service instance moves, it may leave, in addition to the pointer, all required information, such as the cumulative values of the metrics from the leaf to that sub-network, as well as, optionally, the time at which the service instance passes through the sub-network.

A variant for combining service instances can be based on distance vector routing protocols that contain a table with the shortest paths to all destinations. Multiple tables are required in order to reflect different metrics or combinations thereof, unless the multiple metrics are combined into a single metric, as previously described. Exterior gateway routing protocols, such as the Border Gateway Protocol (BGP), contain such tables and are used for ensuring connectivity between sub-networks or autonomous systems. Thus, each sub-network knows its distance to the root, i.e. the service provider.

The sub-networks then exchange information in order to determine which sub-network should move its service instance higher up in the tree. Similar mechanisms, such as the selection of a master, e.g. as applied in many of the routing protocols or server selection procedures in LANs, can be applied to determine the sub-network that can start moving its service instance to the next higher sub-network. Taking into account the metric-based distances, the resulting master can be the one that is furthest away from the service origin entity.

Figure 6:
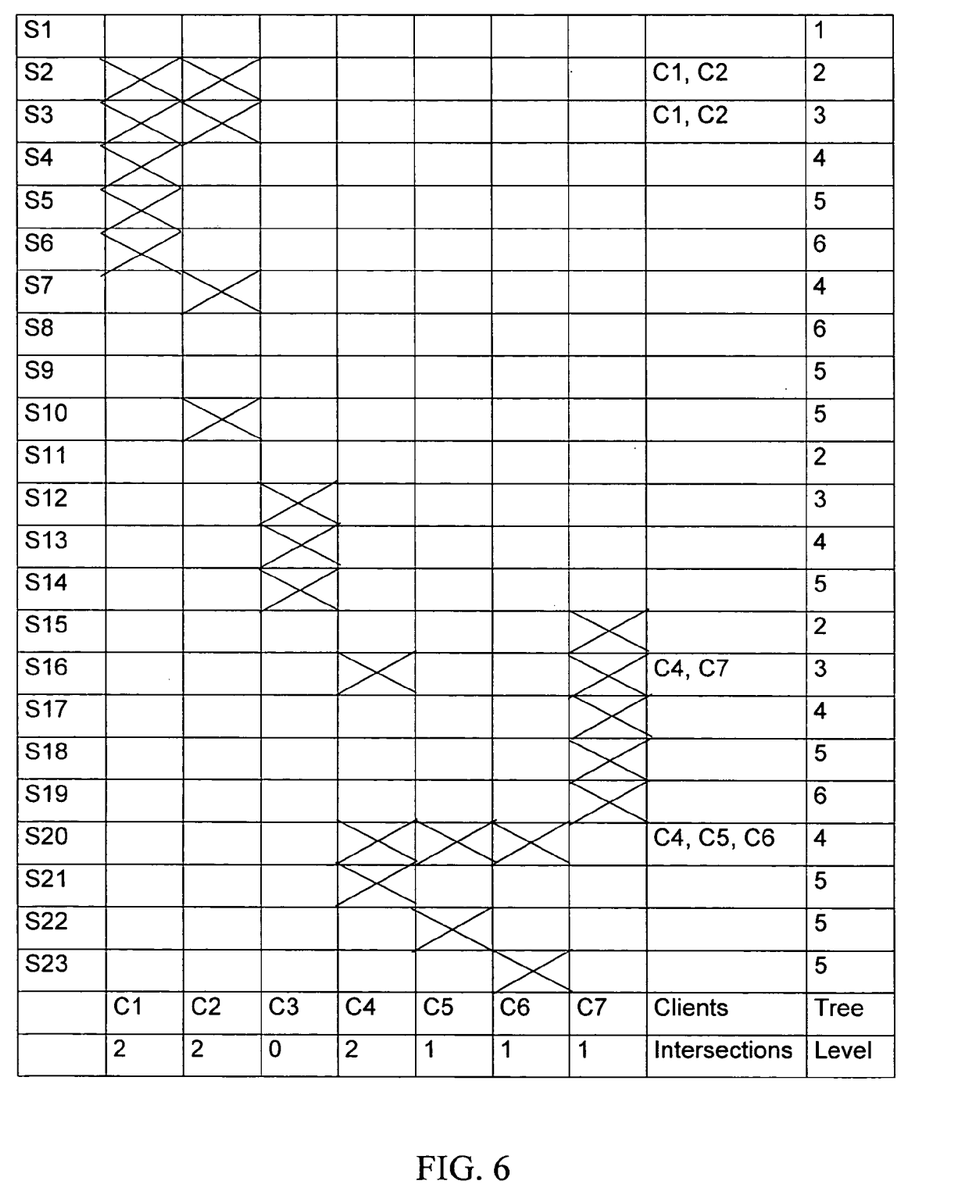
FIG. 6 is a non-limiting example of a table illustrating the analysis carried out for a vertex in the graph modelling the network, in the course of the optimisation method according to the invention in a particular embodiment.

The analysis implementation can be based either on a table as depicted in FIG. 6, or on Petri nets, where the prerequisites are the conditions and the service instances are the tokens in the network.

The table of FIG. 6 may be stored in the vertex that is carrying out the analysis. It shows the ranges for the different clients C1 to C7. From the level in the tree (mentioned in the right-most column of the table) and the corresponding range for a specific client, the sub-network Si (i=1, . . . , 23) that is the closest to the root and can provide adequate service quality to that specific client is known. In the shown example, the highest level in the tree is 1 (the root of the tree is sub-network S1) and the lowest level (the leaves of the tree) is 6. For example, the sub-network S2 fulfils the requirements of clients C1 and C2. It is to be noted that the prerequisites, i.e. the conditions, may reflect cumulative requirements.

The analysis starts by checking all level 6 sub-networks, to determine whether the service instances placed at this level are allowed to be moved higher up in the tree. If yes, the service instances concerned are moved one level higher and a marking is inserted in the table, for indicating that a service instance has reached that higher level sub-network.

In addition, the corresponding metrics are considered and possibly combined with the metrics from other service instances, coming from other branches.

After all level 6 sub-networks have been checked, all level 5 sub-networks are checked in an identical fashion, and so on.

Several parameters and additional indicators can optionally be included in the table above in order to refine or to speed up the analysis. For example, as shown in the last row of the table, an indication may be given as to the number of intersecting sub-networks per client. Intermediate analysis results may be stored in the table to speed up the process.

As a variant, instead of a table-based analysis, a Petri net analysis can be used.

Petri nets are a graphical formalism for systems specification. They are formed from a finite set of places, a finite set of transitions and a finite set of arrows connecting either places to transitions or transitions to places. Graphically, places are usually represented by circles and transitions by bars.

A Petri net is given a state by marking its places. A marking of a Petri net consists of assigning a non-negative integer to each place. This is usually represented graphically by inserting a number of tokens in every place of the net.

A transition may have one or more input and output places. If an arrow goes from a place to a transition, the place is said to be one of the transition's output places. A transition is said to be enabled if there is at least one token in each of the input places. An enabled transition may fire. This means that one token is removed from each input place and one token is inserted in each output place of the transition. If more than one transition is enabled, the model is non-deterministic, in the sense that given an initial marking, different evolutions of the Petri net are possible.

In a Petri net, a transition usually models an event or action, and its firing represents the occurrence of the event or execution of the action. Thus, a transition is enabled if the conditions are satisfied that allow the occurrence of the modelled event or action. The presence of a token in a place may denote the existence of some condition. For instance, a place may model a resource, and the existence of one or more tokens in that place means the availability of one or more instances of that resource. For a more detailed description of the basic principles of Petri nets, reference can usefully be made to "Fundamentals of Software Engineering", by Ghezzi et al., Prentice Hall International, New Jersey, 1991.

According to the invention, the distribution tree is modelled by a Petri net with the same shape. The sub-networks are the places, the service instances are the tokens that carry the corresponding metrics values along and the transitions have associated conditions that are related to the maximum distance that the service instance is allowed to be away from the clients, i.e. from the leaves. This distance can be based on any of the corresponding metrics or combination of metrics that is important for the clients. Each sub-network is reflected by a place in the Petri net. A service placement in a specific sub-network (i.e. a vertex in the distribution tree or in the meshed topology) is modelled by a token in a place in the Petri net.

Tokens are first placed in the leaf places. Moving the service instance towards the root is done by moving the tokens up through the Petri net. In order to move a token from one place to the next, a transition must be enabled and must fire. The firing of a transition is done by the same algorithm as above. To this end, the token will have values that are used and updated by the analyses.

The merging of service instances is done by having transitions with less output tokens than input tokens.

The final distribution of the service instances is reached when the Petri net stops to evolve, i.e. when the tokens do not move and merge any more.

Petri nets can be applied to both the tree-based and meshed topologies.

Scheduling policies can also be used. When the pure non-determinism of the Petri net model is not adequate, we face the problem of specifying a policy for selecting a transition to fire among all the enabled transitions. A fairly simple way to solve this problem is to attach priorities to transitions. Then the firing rule is modified as follows: if, in some state, several transitions are enabled, only the ones with maximum priority are actually allowed to fire.

Priorities are usually defined statically. If tokens carry a value, however, dynamic priorities may be defined, whose values depend on the values of the tokens of the input places of the transitions.

Timed Petri nets can be used as well. Timed Petri nets are Petri nets in which a pair $(t_{min}, t_{max})$ is associated with each transition. Again, such values could be constant or computed as functions of the values of tokens at the input places. Once a transition is enabled, it must wait for at least a time $t_{min}$ to elapse before it can fire. Also, if enabled, it must fire before a time $t_{max}$ has elapsed, unless it is disabled by the firing of another transition before $t_{max}$. A timed Petri net is equivalent to an original Petri net if, for every transition, $t_{min}=0$ and $t_{max}=$indefinite.

Figure 7:
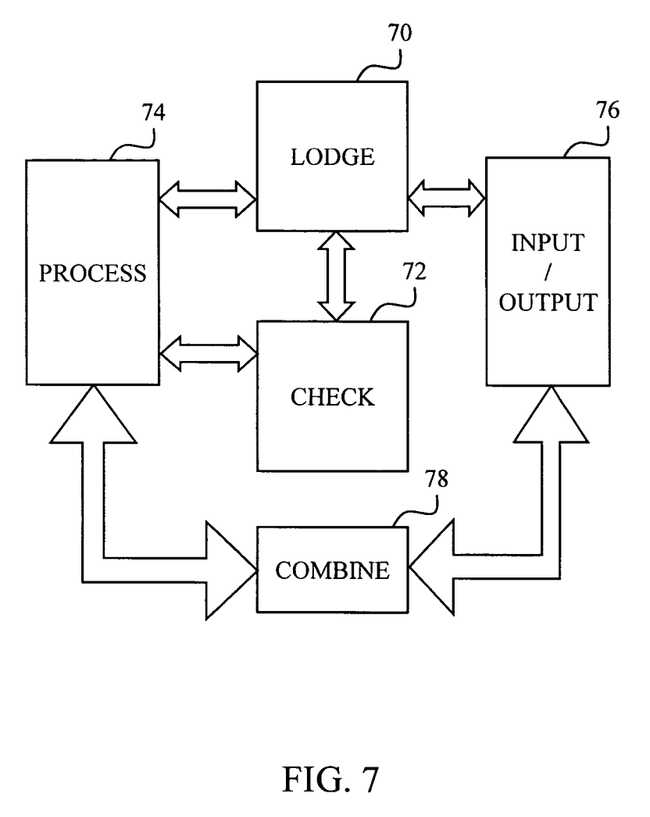
FIG. 7 illustrates schematically a device according to the present invention, in a particular embodiment.

As shown in FIG. 7, a device for determining locations of service instances for optimising distribution of a service in a network, from a source to a plurality of clients each having predetermined requirements, wherein the network can be modelled by means of a graph, according to the invention, comprises:

a lodging means 70, for hosting a service instance,
a checking unit 72, for checking whether the service instance when placed in a vertex on the next higher level can fulfil the requirements of all clients to be served by this service instance, as described previously,
a processing unit 74, for coordinating the lodging unit 70 and the checking unit 72 and for controlling the vertex, and
an input/output unit 76, for sending and receiving messages and service instances.

In the particular embodiment illustrated in FIG. 7, the device further comprises a combining unit 78, for determining that at least two service instances meet in the vertex and for combining these service instances, as described previously.

The invention claimed is:

1. A device for determining locations of service instances for optimising distribution of a service in a Wide Area Network, the service instances each providing the service from a source to a plurality of clients each client having predetermined requirements, wherein said Wide Area Network can be modelled by means of a graph, the device comprising:
   lodging means, for hosting a service instance;
   checking means, for checking whether the service instance when placed in a vertex on the next higher level of the WAN can fulfil the requirements of all clients to be served by said service instance;
   processing means, for coordinating said lodging means and said checking means and for controlling said vertex;
   means for moving the service instance to minimize a number of service instances necessary to provide the service to the client; and
   input/output means, for sending and receiving messages and service instances.

2. A device according to claim 1, further comprises combining means, for determining that at least two service instances meet in said vertex and for combining said service instances into one service instance.

3. The device of claim 1, wherein the Wide Area Network is a telecommunications network.

4. A system for determining locations of service instances for optimising distribution of a service in a Wide Area Network, the service instances each providing the service from a source to a plurality of clients each client having predetermined requirements, wherein said Wide Area Network can be modelled by means of a graph, the system comprising:

means for placing a service instance in each leaf in said graph, said each leaf representing a node directly connected to the plurality of clients;

means for starting with said each leaf and determining whether said service instance, when placed in a vertex on the next higher level, can fulfill the requirements of all clients to be served by said service instance;

in response to an affirmative determination, means for moving said service instance one level higher to minimize a number of service instances necessary to provide the service to the clients.

5. The system of claim 4 further comprises means for determining that at least two service instances meet in said vertex and further combing said two service instances into one service instance.

6. The system of claim 4 further comprises means for determining levels in said graph prior to placing said service instance in said each leaf in said graph.

7. The system of claim 4 wherein said means for determining further comprises a table-based analysis means.

8. The system of claim 4 wherein said means for determining further comprises a Petri net analysis means.

9. The system of claim 4, wherein the Wide Area Network is a telecommunications network.

* * * * *